(12) United States Patent
Laurent et al.

(10) Patent No.: US 11,761,978 B2
(45) Date of Patent: Sep. 19, 2023

(54) VIBRATION MONITOR

(71) Applicant: Schlumberger Technology Corporation, Sugar Land, TX (US)

(72) Inventors: Christophe Laurent, Clamart (FR); Hugues Trifol, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/249,324

(22) Filed: Feb. 26, 2021

(65) Prior Publication Data

US 2021/0270866 A1  Sep. 2, 2021

Related U.S. Application Data

(60) Provisional application No. 62/982,764, filed on Feb. 28, 2020.

(51) Int. Cl.
*G01P 15/18* (2013.01)
*G01P 1/02* (2006.01)
*H04B 1/38* (2015.01)

(52) U.S. Cl.
CPC .............. *G01P 15/18* (2013.01); *G01P 1/023* (2013.01); *H04B 1/38* (2013.01)

(58) Field of Classification Search
CPC ....................................................... G01P 1/02
See application file for complete search history.

(56) References Cited

U.S. PATENT DOCUMENTS

| 8,010,312 B2 * | 8/2011 | Hocker | G01F 1/36 |
| | | | 702/137 |
| 9,291,520 B2 * | 3/2016 | Fleury, Jr. | H01Q 1/42 |
| 10,673,143 B2 * | 6/2020 | Osawa | H01Q 1/273 |
| 2020/0072661 A1 * | 3/2020 | Forster-Knight | G01H 11/08 |

FOREIGN PATENT DOCUMENTS

| CN | 109642460 A | * | 4/2019 | ............ | E21B 47/12 |
| WO | 2021/174179 A1 | | 9/2021 | | |

OTHER PUBLICATIONS

Machine translation of CN109642460 (Year: 2019).*

* cited by examiner

*Primary Examiner* — Walter L Lindsay, Jr.
*Assistant Examiner* — Andrew V Do
(74) *Attorney, Agent, or Firm* — Trevor G. Grove

(57) ABSTRACT

A vibration monitoring apparatus is disclosed that includes a vibration sensor, a controller electrically coupled to the vibration sensor, a power unit electrically coupled to the controller and the vibration sensor, and an environment-resistant material encapsulating the vibration sensor, the controller, and the power unit. The vibration monitoring apparatus includes processing capability to process vibration data and transmission hardware to transmit processed or unprocessed vibration data.

20 Claims, 6 Drawing Sheets

VIBRATION MONITOR

CROSS-REFERENCE TO RELATED APPLICATIONS

This application claims benefit of U.S. Provisional Patent Application Ser. No. 62/982,764 filed Feb. 28, 2020, which is incorporated herein by reference.

FIELD

Embodiments herein generally relate to hydrocarbon prospecting. Specifically, methods and apparatus are disclosed for monitoring equipment vibration in processing environments.

BACKGROUND

In oil and gas production, and particularly in testing of hydrocarbon well production, it can be useful to monitor vibration in piping and equipment. Vibration monitoring in piping can help in understanding of flow characteristics such as multi-phase flow rates, flow obstructions from, for example, hydrate formation, flow leakage, flow changes at the choke of a well testing facility, gun shock detecting, and sand characteristics. Vibration monitoring in equipment can help in understanding reliability of the equipment, the need for preventive maintenance, and nascent malfunctions. Current solutions for vibration monitoring are limited. Most are connected by wire and are sensitive to environmental factors such as moisture. There is a need in the industry for a more useful vibration monitoring solution.

SUMMARY

Embodiments described herein provide a vibration monitoring apparatus that includes a vibration sensor, a controller, and a power unit all encapsulated in an environment-resistant material.

Other embodiments described herein provide a vibration monitoring apparatus, comprising an accelerometer, a controller electrically coupled to the accelerometer, a storage unit electrically coupled to the controller, an inductively rechargeable battery electrically coupled to the accelerometer, the controller, and the storage unit, and an environment-resistant material encapsulating the accelerometer, the controller, the storage unit, and the inductively rechargeable battery.

Other embodiments described herein provide a vibration monitoring apparatus, comprising an operative unit encapsulated in an environment-resistant material Other embodiments described herein provide a monitoring system including a plurality of operating units connected by fluid conduits and at least a vibration monitoring apparatus as described hereinabove coupled to one of the operating units and the fluid conduits, wherein the monitoring system is for processing liquid and gaseous hydrocarbons produced from a hydrocarbon reservoir, wherein the plurality of operating units include at least one of a phase separator, surge tank, pump, liquid manifold, gas manifold, heater, a valve, a flow meter

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
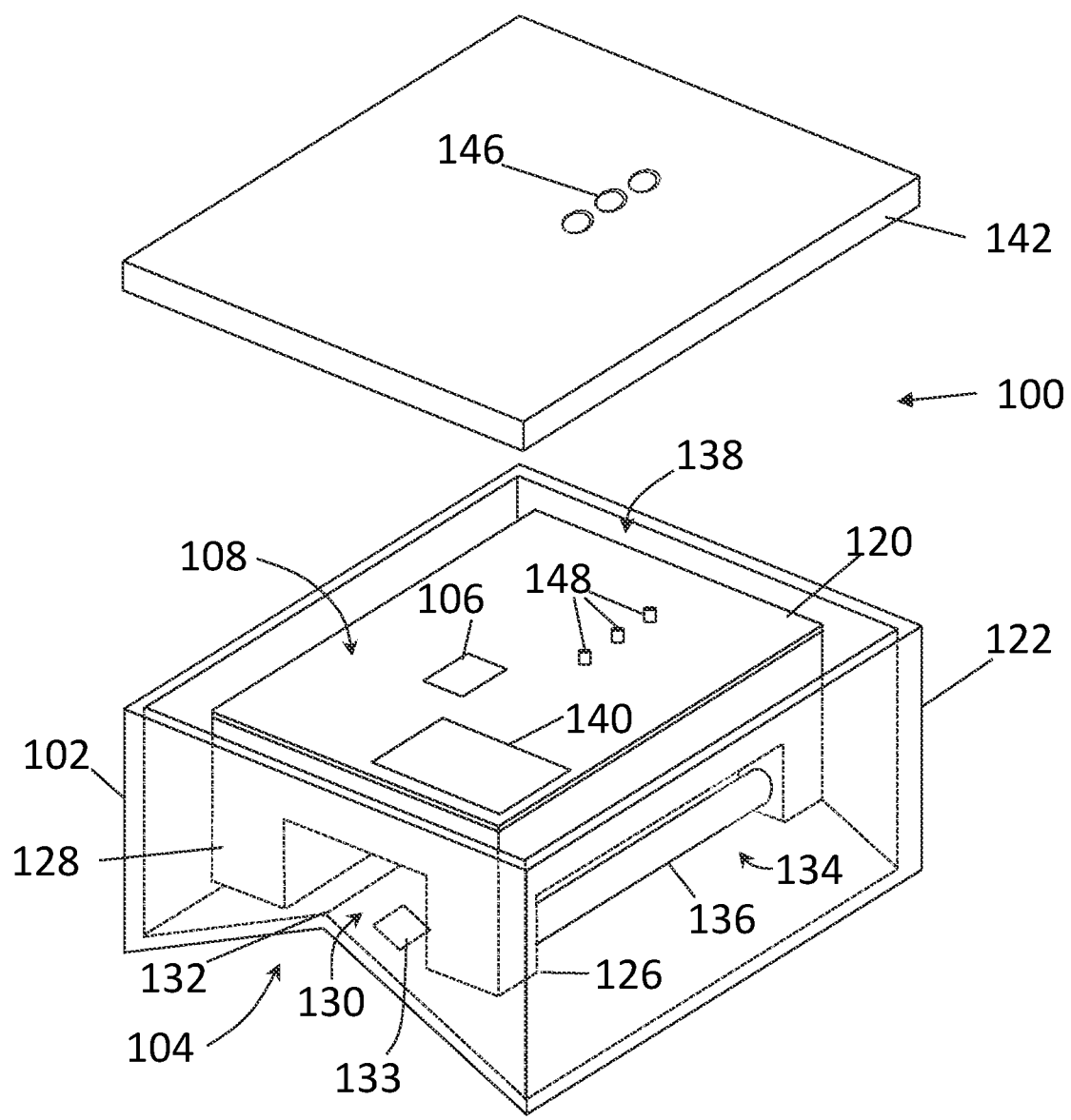
FIG. 1 is an isometric view of a vibration monitoring apparatus according to one embodiment.

FIG. 1 is a functional block diagram of a vibration monitoring apparatus 100 according to one embodiment. The apparatus 100 includes a container 102 that facilitates attachment of the apparatus 100 to a tubular object such as a cylindrical pipe. The container 102 is made of a material that is resistant to high temperatures and hydrocarbon environments, including acids normally encountered in hydrocarbon processing. Plastics such as polypropylene, polyurethane, and polyisocyanate, and mixtures thereof, can be used. The container 102 can be molded or printed.

The container 102 has a non-planar contact surface 104 for transmitting vibration from the tubular object to a vibration sensor 106, located in a circuitry portion 108 of the apparatus 100. The non-planar contact surface 104 may be angled, with a single angle as in FIG. 1, or may have multiple angles or may be curved. The non-planar contact surface 104 is configured to contact an object to be monitored for vibration at more than one contact point. Contacting the object at more than one contact point increases attachment stability of the apparatus 100 to the object being monitored. The apparatus 100 may have a fastening device, such as a strap or bracket, to fasten the apparatus 100 to the object for monitoring.

The container 102 here has two separable parts. A first part 120 fits within a second part 122. The second part 122 has the contact surface 104, and both the first part and the second part are made of plastic, as described above. The first part 120 has the circuitry portion 108. The circuitry portion 108 extends over an area, and in this case is rectangular, but could be any shape. A stand portion 126 extends from the circuitry portion 108 in a direction generally perpendicular to a plane defined by the circuitry portion 108. Here, the stand portion 126 comprises two walls 128 that extend in a direction along an axis of the first part 120 and extend from opposite sides of the circuitry portion 108 away from the plane defined by the circuitry portion in a direction perpendicular to the plane. Between the walls 128 is a notch 130 that extends in the same direction as the walls 128 in the direction along the axis of the first part 120. The notch 130 allows the walls 128 to straddle a peak 132 of the second part 122, extending in the direction along the axis of the first part 120, that in part defines the non-planar surface 104.

At least one of the walls 128 has a recess 134 in an outer surface thereof that generally extends in the direction along the axis of the first part 120. The recess, in this case, is a battery compartment, where a battery unit 136 is disposed. The battery unit 136 includes one or more rechargeable batteries capable of integration with an inductive charging portion. When the stand portion 126 is placed on a surface, and the circuitry portion 108 and battery unit 136 are installed, the battery unit 136 resides beneath the circuitry portion 108 in the recess 134. Connectors (not shown) are provided in the recess 134 for electrically coupling the battery unit 136 with the circuitry portion 108.

The first part 120 is assembled, with the stand portion 126, circuitry portion 108, and battery unit 136, and is then placed into the second part 122. The walls 128 contact an interior of the second part 122 when the first part 120 is placed into the second part 122, straddling the peak 132, as mentioned above. The second part 122 thus has a non-planar interior surface that engages with the walls 128. In other embodiments, the second part 122 may be shaped to provide the non-planar contact surface 104 on the exterior of the second part 122 and a planar interior surface for engaging with the first part 120. Any mode of engagement between the first part 120 and the second part 122 may be contemplated. For example, the interior surface of the second part 122 may be concave, and/or may have a groove for engaging with the walls 128.

The first part 120 and the second part 122 together define a gap 138 in an interior space of the second part 122. When the first part 120 is installed into the second part 122, the gap may be filled with a sealant material that encapsulates the electronics, insulating the electronics from the environment. In this case, the battery unit 136 is also encapsulated, so charging the battery unit 136 requires remote charging such as inductive charging. For this reason, a charging portion 140 is included in the circuitry portion 108 within the container 102.

The first part 120 has a lid 142 that encloses the circuitry portion 108. In this case, the lid 142 has a plurality of holes 146 that allow viewing of indicator lights 148 attached to the circuitry portion 108. The indicator lights 148 show a status of the apparatus 100, in this case battery charge. The lid 142 of the first part 120 is installed before the second part 122 is filled with encapsulant, so the electronics inside the first part 120 (e.g. the circuitry portion 108 and the battery unit 136) are sealed within the apparatus 100. The second part 122, in this case, does not have a lid. The second part 122 is a container that holds the first part 120 and is filled with encapsulant to protect and immobilize the first part 120, and hardware contained in the first part 120. A lid can be used, if desired, with the second part 122. For example, after filling the second part 122 with encapsulant, a lid can be applied before the encapsulant sets.

The gap between the first part 120 and the second part 122 is large enough to provide a layer of protective encapsulant between the electronic hardware in the first part 120 and the outer environment. Sealing the electronics inside an environment resistant encapsulant makes the apparatus 100 usable in various restricted ways. Disposing the operative components of the vibration monitor inside the first part before encapsulating allows the components to be accessed, following encapsulation, by cutting through the second part 122, the encapsulant, and the first part 120. The operative components can then be maintained or replaced. The operative components can then be disposed in another first part 120 and second part 122, and re-encapsulated.

By encapsulating the operative components, the apparatus 100 is ATEX Zone 1 compliant and is an "mb" type apparatus under EN-60079-18. The circuitry portion 108 of the first part 120 sits below the top of the second part 122 to allow encapsulant to flow over and seal all around the first part 120 without spilling out of the second part 122. Thus, in this case, the second part 122 extends 3-6 mm above the top of the first part 120 to provide a layer of encapsulant over the first part 120 that is thick enough for protection and thin enough to allow for inductive charging from an inductive source on the inside surface of the lid 142.

The encapsulant is generally an environment-resistant material derived from a precursor that can flow into the gap between the first and second parts 120 and 122 before solidifying into the environment-resistant material. The type of encapsulant can be selected based on the environment in which the vibration monitor is to be used. Many encapsulants that are convenient for such purposes are A/B polymers made by blending a liquid A material with a liquid B material and allowing the mixture to cure. Polyurethanes, epoxies, and amine-aldehyde resins are examples of resins that can be used to encapsulate the components of the vibration monitors described herein. Resins from conjugate reactions such as Michael reactions or Diels-Alder reactions can also be used. Mixtures and multi-polymers of such materials can also be used.

Such materials are useable in many environments that would otherwise be hostile or inadvisable for electronic components. For example, the encapsulated vibration monitors described above can be used while immersed in water, or in a chemically active atmosphere or liquid, such as acidic or basic liquids or atmospheres. The encapsulant can be impregnated with other types of barriers to extend the range of atmospheres and environments in which they can be used. For example, lead shielding can be applied to the outside of the first part 120, if desired, to allow using the vibration monitor in a radioactive environment. Alternately, shielding particles such as lead or lead oxide particles can be incorporated in the encapsulant precursor liquid material to provide radiation shielding following cure. If viscosity of the liquid precursor material becomes too high, solvent can be used to target a workable viscosity so that the gap between the first and second parts 120 and 122 can be filled.

The vibration monitoring apparatus 100 of FIG. 1 has a second vibration sensor 133. The second vibration sensor 133 is an optional component that can be used to increase the frequency response range of the apparatus 100. The second vibration sensor 133 is configured to have usable sensitivity in frequency ranges where the vibration sensor 106 has low sensitivity. For example, in one embodiment, a MEMS device may have useful frequency response up to about 2 kHz, while a microphone has useful frequency response above 2 kHz. The second vibration sensor 133 may be located along a lower surface of the apparatus 100 to be located close to the source of vibration. Since higher frequency vibrations tend to attenuate over shorter distances than lower frequency vibrations, locating the second vibration sensor 133 closer to the source of vibration increases detectability of high frequency vibrations. The second vibration sensor 133 may be located inside the second part 122 or on an outer surface of the second part 122.

Figure 2:
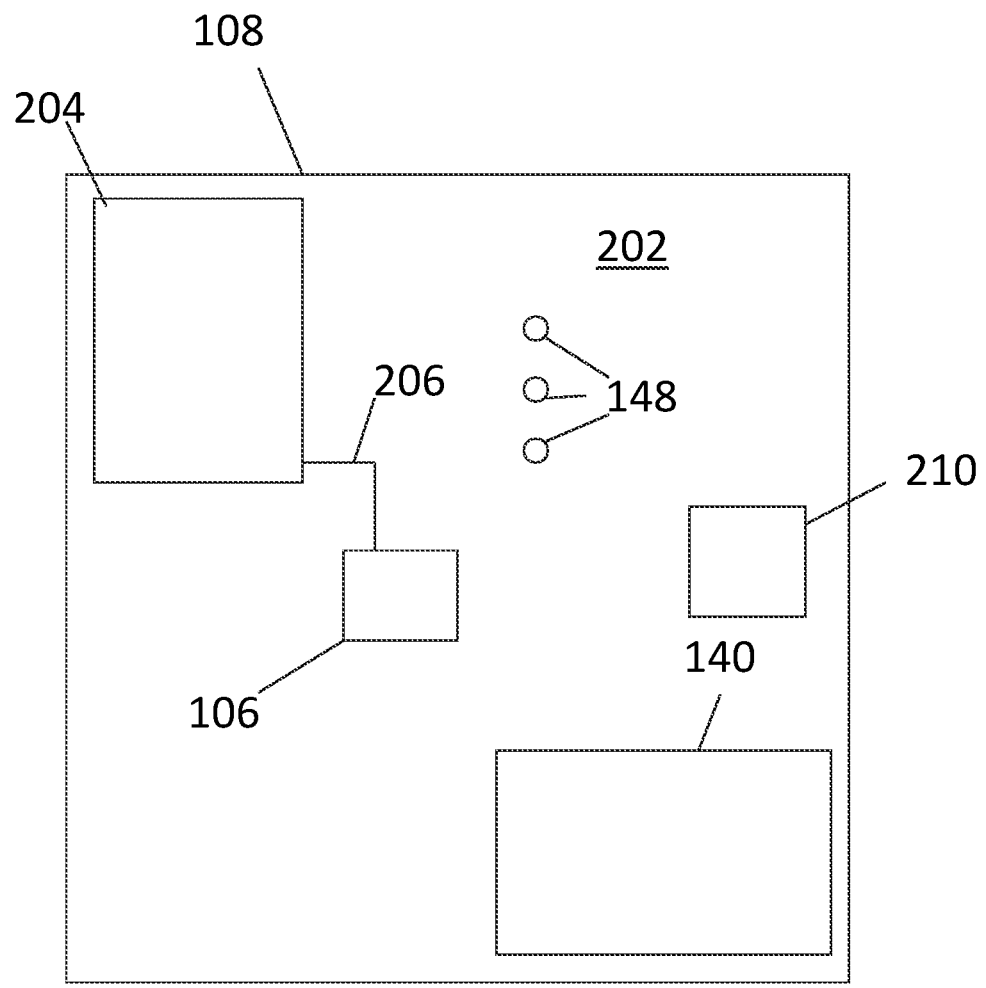
FIG. 2 is a top view of a circuitry portion of the vibration monitoring apparatus of FIG. 1, according to one embodiment.

FIG. 2 is a plan view of the circuitry portion 108 of the apparatus 100. The vibration sensor 106 is a 3-axis vibration sensor located in a central area of the circuitry portion 108.

The vibration sensor 106 is for instance a MEMS accelerometer, such as an MPU 9250 accelerometer. The circuitry, including the vibration sensor 106, of the circuitry portion 108 is attached to a circuit board 202 that integrates with the first part 120 of the apparatus 100. The vibration sensor 106 is electrically coupled to a digital microcontroller unit 204. A voltage regulation circuit (not shown) can be included in the circuitry portion to condition power coming from the batteries 136 to the circuitry portion 108 and/or to condition power going from the charging unit 140 to the batteries 136.

The circuitry components shown as part of the circuitry portion 108 are shown in a configuration parallel to the circuit board 202, and generally in rectilinear alignment with the circuit board 202. The circuitry components can be oriented non-parallel with the circuit board 202, if desired. For example, socket connections can be provided on the circuit board 202, and the circuitry components, as appropriate, can be connected by insertion into the socket connector, such that the circuitry components so connected are substantially perpendicular to the circuit board 202. Other orientations can also be used. Additionally, the circuitry components can be unaligned with respect to the rectilinear orientation of the circuit board 202. For example, one or more of the circuitry components could be positioned such that a major axis of the circuitry component forms an angle with a major axis of the circuit board 202 that is not zero or 90°.

In certain situations, the vibration sensor 106 may be oriented to amplify its sensitivity. For example, if the vibration sensor 106 has sensitivity in two perpendicular directions, the vibration sensor 106 can be oriented to sense a vibration mode in a direction that is a vector sum of the two perpendicular directions, such that the sensitivity of each perpendicular direction contributes to the overall sensitivity in the direction of the vibration mode to be detected.

Figure 3:
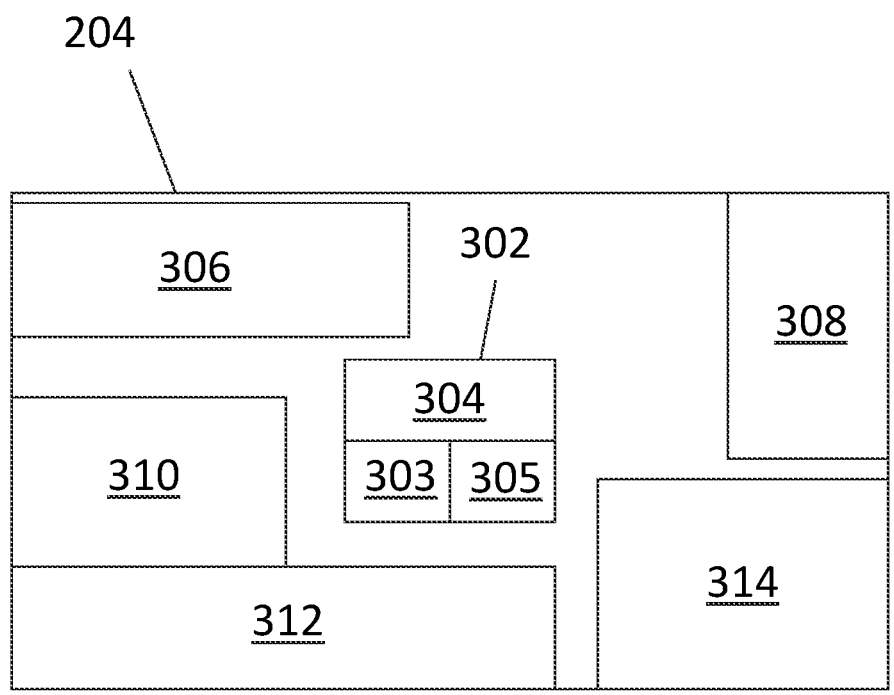
FIG. 3 is a block diagram of a microcontroller of the circuitry portion of FIG. 2.

FIG. 3 is a block diagram showing units of the digital microcontroller unit 204. Here, the digital microcontroller unit 204 includes a core module 302, which has a digital processor 304, that generally operates at a high-frequency clock speed, ROM 303, and SRAM memory 305. The digital microcontroller unit 204 contains programming, stored in the ROM 303 and/or the RAM 305, that when executed by the digital processor 304 causes the digital processor to perform certain pre-processing of vibration data. Such pre-processing may include frequency analysis such as Fast Fourier Transform analysis. Any other type of integral transform analysis can be included to target specific frequencies and patterns of vibration. Other processing to amplify, diminish, focus, or defocus known or suspected patterns of vibration, such as noise treatment, frequency filtering and amplification, signal-to-noise optimization, and other treatments can be included in the pre-processing programming. Convolution and deconvolution processing can be included. Pre-processing the vibration data can reduce the volume of data to be transmitted by the vibration monitor 100. It should be noted that the pre-processing is optional, that the vibration monitor 100 may, additionally or instead, transmit raw vibration data. Raw vibration data can be used for troubleshooting and diagnosis of problems with the vibration monitor, or for quality control of the data produced by the vibration monitor.

The digital microcontroller unit 204 also includes a communication module 306, which has radio, BLUETOOTH, and WiFi transceivers. An SD card may be provided for mass storage of vibration data. When pre-processing vibration data, the digital processor 302 can obtain vibration data from the SD card, process the vibration data, and store the processed data on the SD card Flash memory 308, hardware acceleration unit 310, and low power management subsystem 312 which are provided, along with several peripheral interfaces, with/in an interface module 314, for secure communication, infrared, Ethernet, temperature sensors, touch sensors, A/D converters, and serial interfaces. The serial interface of the digital microcontroller unit 204 is electrically coupled to the vibration sensor 106 by a serial bus 206. In one case, the apparatus 100 uses the MQTT communication protocol for wireless communication, but any convenient protocol can be used.

The interfaces can be used to integrate other sensors with the vibration sensor. For example, a temperature sensor can be connected using one of the interfaces and used to monitor temperature in the environment around the vibration monitor. The temperature sensor would be located near the surface of the environment-resistant encapsulant to sense the environmental temperature. In one embodiment, the temperature sensor can be wired to one of the interfaces using a wire that extends across the gap between the first and second parts 120/122 of FIG. 1. The environment-resistant material is then formed in the gap, leaving the temperature sensor outside the environment-resistant material and wired to the vibration monitor through the environment resistant material. The temperature sensor can then be attached to the environment-resistant material using a thin film of encapsulant The charging portion 140 is included in the circuitry portion 108 and electrically coupled to the battery unit 136 (not shown in FIG. 2), which when assembled is located on the opposite side of the circuit board 202 from the circuitry portion 108. The charging portion 140 charges the battery unit 136, and can be powered by an inductive source. An inductive source is attached to the interior surface of the lid 142 of the first part 120, in this case, but may be coupled to the apparatus 100 at any convenient location. A smart reboot circuit 210 (FIG. 2) may be included in this embodiment to reboot the processing hardware, after a low power shutdown, when charging commences. For example, in a low power situation, the low power management subsystem 312 (FIG. 3) activates to supply power to essential components. When charging begins, the smart reboot circuit 210 is configured to reboot the processing hardware automatically.

Figure 4:
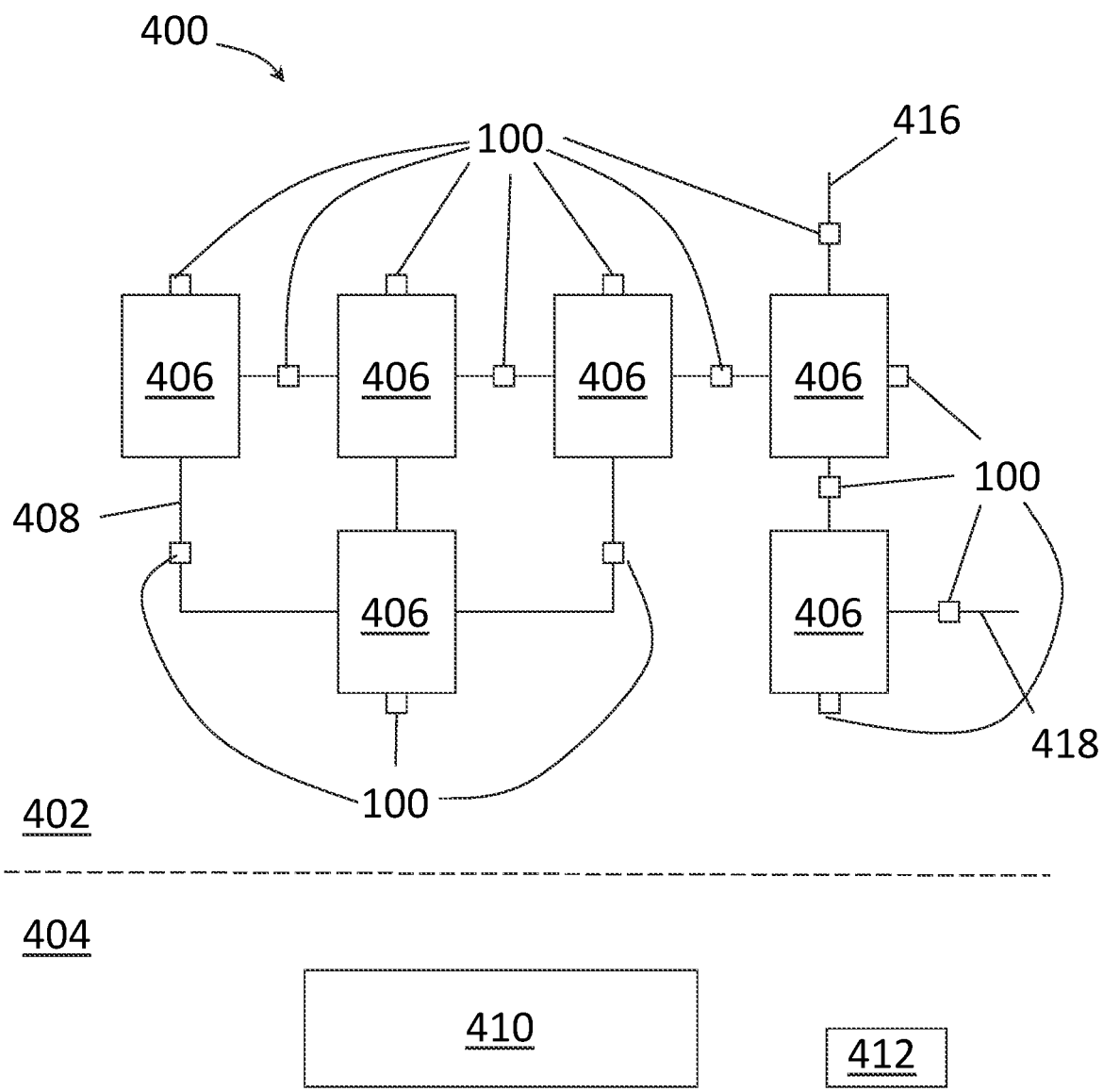
FIG. 4 is a schematic plan view of a processing system according to one embodiment.

FIG. 4 is a schematic plan view of a monitoring system 400 according to one embodiment. The monitoring system 400 of FIG. 4 has a monitoring area 402 and a non-monitoring area 404. The monitoring area 402 has a plurality of operating units 406 connected by fluid conduits 408. A plurality of vibration monitors 100 is coupled to the various operating units 406 and fluid conduits 408 to monitor vibration in all areas of the monitoring system 400. The monitoring area 402 may have environment or atmosphere that is incompatible with operating electronics, but the vibration monitors 100 are all sealed for isolation from the environment to prevent unwanted interaction between the electronics and the environment. A data hub 410 is located in the non-monitoring area 404. The non-monitoring area 404 has an environment that is not incompatible with operating electronics, so the data hub 410 can be safely located and operated in the non-processing area 404.

The data hub 410 includes wireless communication hardware for communicating with the vibration monitors 100, each of which has wireless communication hardware, as described above. The data hub 410 can also have processing capability for analyzing vibration patterns in the data harvested from the vibration monitors 100. All the processing routines described above for the digital microcontroller unit 204 can also be included in the data hub, for example if the vibration monitor 100 transmits raw vibration data. The data hub 410 may then include hardware and software for performing Fourier Transform, or other integral transform, analysis of the vibration data. For example, in one case, the data hub includes a Fast-Fourier Transform algorithm. Other noise treatment, signal-to-noise treatment, filtering, and optimization routines and capabilities may be included in the data hub. The data hub 410 can also include hardware and software for operating artificial intelligence analysis routines, such as neural networks and principal component analysis routines. The various processing routines can be arranged to work in serial and/or parallel modes by arranging processing flow within the data hub 410. The data hub 410 is also configured to communicate with one or more of the operating units 406 via a wired or wireless communication. The data hub may also include a user interface for interacting with a user, such as as display, tablet, etc.

The operating units 406 may be any operating units, but in one example, the operating units 406 are for processing liquid and gaseous hydrocarbons produced from a hydrocarbon reservoir. So, for example, the operating units 406 may include phase separators, surge tanks, pumps, liquid and gas manifolds, heaters, valves, flow meters and the like. A liquid product line 416 and a gas product line 410 are included in this case. As shown in FIG. 4, the vibration monitoring apparatus 100 can be coupled in all manner to operating units and conduits to monitor vibration in any part of the monitoring system. If desired, vibration monitors 100 can be moved from one location in the monitoring system 400 to another. The vibration monitors can indicate equipment failure or near failure and detect flow or lack thereof in a conduit.

For example, in a first application, if a valve (such as a safety relief valve) is activated (opened or closed), a vibration monitor disposed on the valve may detect activation of the valve or leak at the valve. For such application, the vibration monitor may also enable to determine fatigue of the valve. In a first embodiment, activation of the valve may be determined by comparing the vibration data to a threshold. For instance, a processed signal of the vibration monitor 100 may be compared with one or more threshold, for instance in one or more frequency bands. In a second embodiment, the status of the valve may be determined by comparing a signal based on the vibration data to a calibration signal representative of at least one event signature. In the present case, for instance, the processed signal of the vibration monitor 100 may be compared to a plurality of calibration signals corresponding respectively to one or more functional valve activation signatures, one or more fatigued valve activation signatures and one or more valve leak signatures. In order to determine to which signature the processed signal corresponds, specific features of the signal may be extracted and compared to the calibration signals. Alternatively, a machine learning model (such as neural network) may be used to classify the processed signal in view of the calibration signals.

In another application, a vibration monitor can analyze the material flowing in the conduit. For instance, the vibration monitor can detect when solids, are present in a fluid flow and possibly determine the type of the solids, either rocks, metal, sand or hydrate solids. The vibration monitor can also be used to infer fluid nature, for example, if the fluid consists of gas, oil, water or a mix of several fluids, which is especially advantageous in applications where sampling is challenging (such as when the fluid comprises a toxic gas such as H2S or solids that may damage the sampling installation). As explained above, the presence of solids or type of fluid flow may be detected by comparing the processed signal obtained from the vibration monitor with one or more calibration signal corresponding to the signatures of the flow in different configuration (including different type of solids or with different flow composition). Such comparison may be performed as indicated above using classical processing or machine learning techniques.

In a third application specific to a floating platform, a vibration monitor 100 may enable to establish reference vibration of the platform (due for instance to a crane activation).

More generally, changes in vibration patterns can also be detected by the vibration monitors 100 and related to significant events involving the monitored equipment. As explained above, a signal based on the vibration data obtained from the vibration sensor, such as a signal representative of raw vibration data or of processed data may be compared with calibration signals corresponding to one or more event signature in order to detect such events.

The output of the vibration monitor may be used by the data hub to perform one or more actions in connection with the monitoring system.

In a first embodiment, it may be used to correct a measurement performed by an operating unit of the monitoring system. For instance, in the third application mentioned above, the reference vibration of the floating platform may be used to correct the output of a flow meter, such as a Coriolis flow meter, also disposed on the floating platform and perturbated by the reference vibration.

In another embodiment, it may be used to trigger an alarm on a user interface. For instance, in the first application, it may generate an alarm to let the user know that the relief safety valve has been opened, which may trigger an emergency procedure. If a leak or fatigue on a valve is detected, an alarm for maintenance on this valve may also be triggered. Similarly, in the second application, if sand is detected, an alarm for inspection and maintenance of sand filters may be triggered. The alarm may be visual (such as on a display of the user monitor), and/or auditive.

In another embodiment, the output of the vibration monitor may be used as an input to generate a parameter value of one or more of the operating units of the monitoring system based on a model of the system stored in the data hub (such model using for instance historical data that comprise operational adjustment data for operational adjustments responsive to conditions). For instance, a parameter of one of the units of the system may be generated in order to obtain optimal operational conditions of the system, emergency operational conditions or diagnostic conditions for diagnostics of unit of the system. Once the parameter is generated, the system may be automatically controlled using the generated parameter value.

A method for automatically controlling a system based on sensor data—in this case, vibration monitor data, is described in more details in the U.S. Provisional application entitled "Autonomous Surface System" having Ser. No. 62/982,766, filed 28 Feb. 2020, which is incorporated by reference herein.

For instance, in the first application described hereinabove, when the activation of the safety relief valve is detected via the vibration monitor, emergency procedures modifying the parameter values of one or more units such as the phase separator may be triggered by the control system. Similarly, in the second application, when a certain fluid flow is detected, parameter values of the phase separator may be modified so that the separator is tuned to analyze the flow in an optimal way. In another example, when hydrates in a solid form are detected, the temperature of a heater of the monitoring system may be increased.

The monitoring system 400 may also include a charging station 412 for wirelessly charging the vibration monitors 100, for example using inductive charging. A vibration monitor 100 with low battery charge, as indicated by the indicator lights 148 (FIG. 1), or by signal to the data hub 410, can be uncoupled from the equipment or conduit being monitored and can be brought to the charging station 412 for recharging. After recharging, the vibration monitor 100 can be redeployed at a convenient time and location. For example, one or more extra vibration monitors 100 can be staged at the charging station 412. When a vibration monitor 100 in the monitoring area 402 reaches a low battery state, it can be replaced with one of the extra vibration monitors 100 from the charging station 412 so that there is essentially no interruption in monitoring. The vibration monitor 100 with low battery can then be taken to the charging station 412 and recharged for future redeployment.

The vibration monitors described herein can be used for monitoring any vibration detectable by the device. The vibration monitor may be in contact with a vibrating object, or may be spaced apart from the vibrating object but still able to detect the vibration. Vibration monitors of this type can be used for a vast array of vibration monitoring, from seismic monitoring, to effects of wind on structures or vehicles, to operating machinery, to acoustics. These vibration monitors can also be used in water without modification. Any vibration detectable in any way by the vibration monitors herein can be monitored and analyzed using the apparatus and methods described herein.

The vibration monitors described herein can be used remotely. For example, in the embodiment of FIG. 4, the data hub 410 may be connected, using a wire or wireless network, to a processing system that includes hardware and software for displaying, integrating, and processing data from vibration monitors at multiple remote locations. In this way, vibration monitors can be deployed by field personnel at multiple locations anywhere in the world, including subsea locations, and the data captured by the vibration monitors can be reviewed and analyzed in one or more centralized locations.

Figure 5:
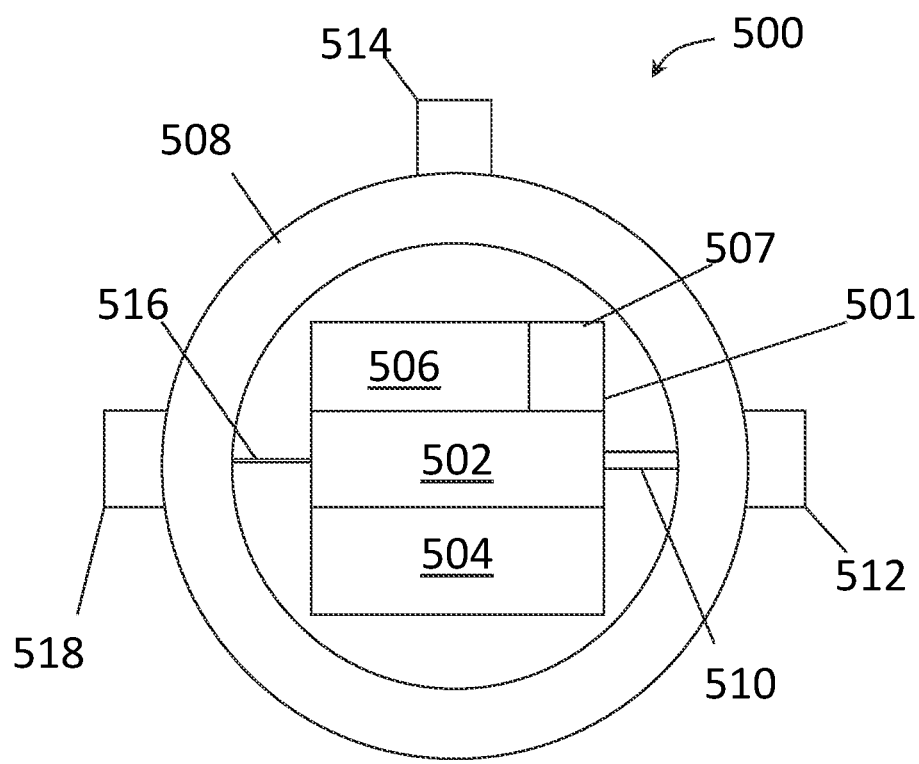
FIG. 5 is a schematic top view of a vibration monitoring apparatus according to another embodiment of the disclosure.

In other embodiments, a vibration monitoring apparatus can be made ATEX Zone 1 compliant by enclosing the components of the apparatus in an explosion-proof container, such as an "Ex d" box. FIG. 5 is a schematic top view of a vibration monitor 500 according to another embodiment. The vibration monitor 500 has an operational module 501 contained within an explosion-proof container 508. The explosion-proof container 508, in this case, has a transparent portion that enables viewing the operational module 501 inside. The operational module 501 includes a sensor module 502, a data module 504, a communication module 506, and optionally a storage module 507. In this case, power is supplied externally by a power connection 510 suitably coupled through a port 512 of the container 508. The container 508 may have a tab 514, or other type of physical extension, that can be used to attach the vibration monitor 500 to an object, such as a pipe, to monitor vibration. A fastener can be used to hold the tab 514 against the object to which the vibration monitor 500 is fastened. For example, a tie can be looped around the tab 514 and around the monitored object to secure the vibration monitor 500 to the object. In this case, the vibration monitor 500 can forego use of batteries altogether, making the vibration monitor 500 battery-less. In other cases, rechargeable batteries can be provided for recharging using the port 512.

The communication module 506 may be a wireless communication module or a wire communication module. In the embodiment of FIG. 5, the communication module 506 is a wire communication module, such as an Ethernet module. A wire connection 516 is provided through a second portal 518 for communicating signals to and from the communication module 506. In the case where the communication module 506 is wireless, the wire connection 516 can be omitted and the second portal 518 omitted, unused, or used for another purpose.

In general, while the communication features of the various embodiments described herein can be used to transmit data and/or signals from the vibration monitors to a receiving unit, the communication features can also be used to upload data and/or signals to the vibration monitors from another sending unit. For example, processing commands can be transmitted from a control unit to the vibration monitor. Additionally, firmware and/or calibration data can be uploaded and/or updated on a vibration monitor using the communication features therein. In the case of calibration data, new calibration information can be uploaded for any of the instruments included in the vibration monitor, such as the vibration sensor itself and any other instruments, such as temperature instruments, in the vibration monitor. Various programming can also be uploaded/updated on the vibration monitor, such as programming to perform diagnostic tests, synchronization programming, automated processing and transmission programming, user interface programming, and the like.

Figure 6:
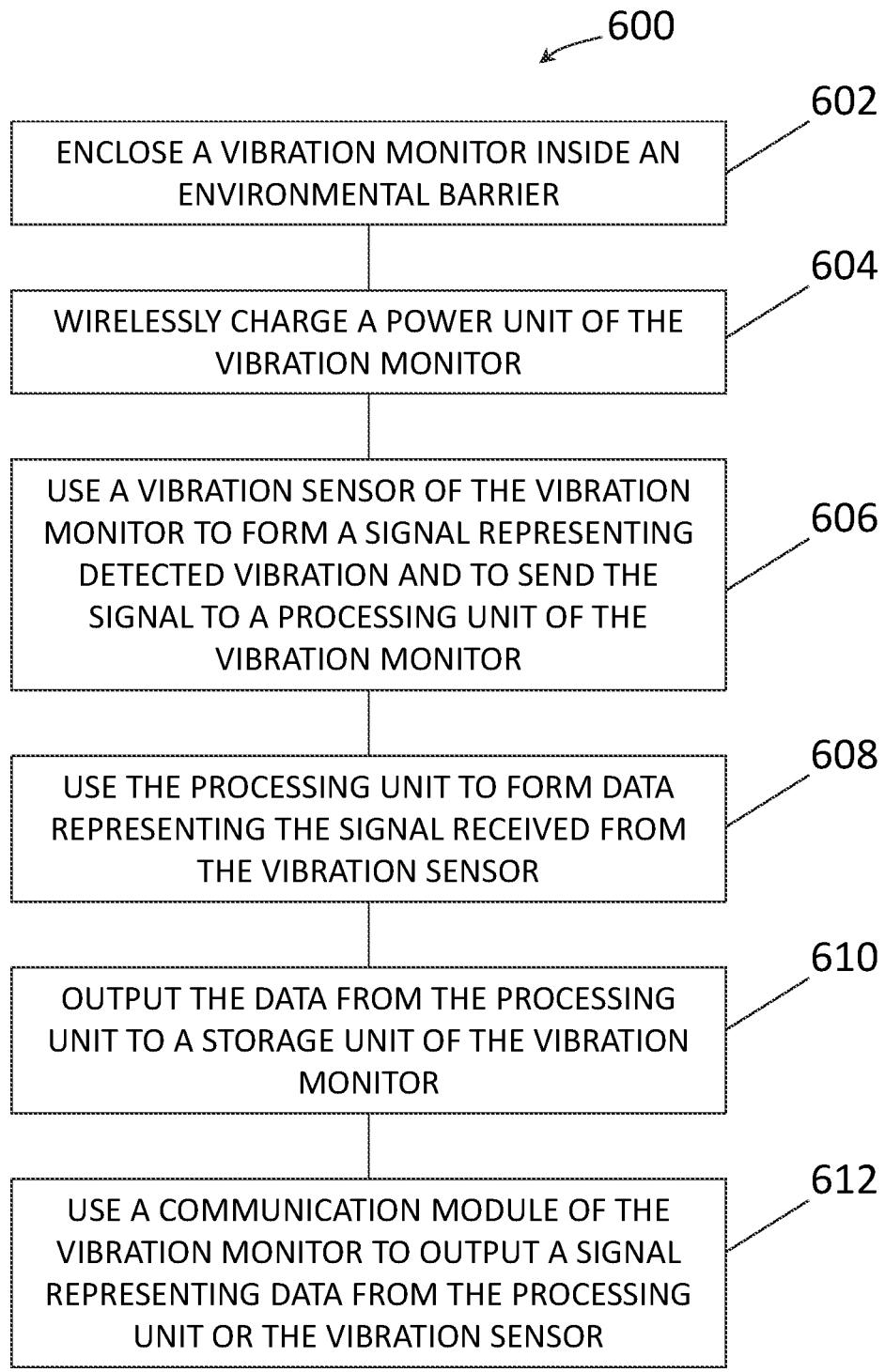
FIG. 6 is a flow diagram summarizing a method according to one embodiment of the disclosure.

FIG. 6 is a flow diagram summarizing a method 600 according to one embodiment. The method 600 is a method of monitoring vibration of a monitored article in a monitoring environment. The monitoring environment may feature an atmosphere with combustible components. At 602, a vibration monitor is enclosed inside an environmental barrier. The vibration monitor includes a chargeable power source, a vibration sensor, a processing unit, and a communication unit. The vibration monitor may also include a storage unit. At 604, the power source is charged wirelessly. For example, the power source may be one or more rechargeable batteries coupled to a wireless charging circuit, such as an inductive charging circuit. The power source, in this case, can be charged by positioning the inductive charging circuit within an inductive field.

The environmental barrier is a material that shields the vibration monitor from an external environment that may negatively affect the vibration monitor or react with the vibration monitor in undesired ways. For example, the environmental barrier may be a barrier that prevents a combustible material from reaching the electronics, or other operative components, of the vibration monitor. Alternately, the environmental barrier may be a barrier that prevents components of the environment, such as water, acid, sulfur, and the like, from reaching the electronics, or other operative components, of the vibration monitor.

At 606, the vibration sensor is used to form a signal representing detected vibration, and to send the signal to the processing unit. The signal may be a voltage signal or a current signal, which may emanate from a MEMS or piezoelectric vibration sensor, for example. The signal may be conditioned in any suitable way before exiting the vibration sensor, or within the processing unit.

At 608, the processing unit is used to form data representing the signal received from the vibration sensor. The data may be a time series of voltage or current, or a convenient transformation thereof. For example, the processing unit may perform any type of integral transform to general spectrum data. The processing unit may also perform modeling, statistical analysis, noise processing, or other useful processing. The processing unit may also perform processing to present the data on an output device, such as a display, to manipulate the data for display purposes, or to prepare the data for communication using the communication module.

At 610, the processing unit outputs a signal representing data produced by the processing unit to the storage unit for storage. At 612, the communication module outputs a wireless signal representing data obtained from the processing unit, or directly from the vibration sensor. The wireless signal is output according to a standard that can be interpreted by any receiving device. In this way, the vibration monitor can be completely free of electrical connections outside the oxygen barrier. The communication module may also receive wireless signals sent from an external unit for purposes of programming the processing unit or delivering commands to the processing unit to produce or manipulate data.

While the foregoing is directed to embodiments, other and further embodiments of the present disclosure may be devised without departing from the basic scope thereof, and the scope thereof is determined by the claims that follow.

The disclosure relates to a vibration monitoring apparatus, comprising a vibration sensor, a controller electrically coupled to the vibration sensor, a power unit electrically coupled to the controller and the vibration sensor, and an environment-resistant material encapsulating the vibration sensor, the controller, and the power unit.

In an embodiment, the power unit comprises an inductively rechargeable battery.

In an embodiment, the vibration monitoring apparatus further comprises a wireless transceiver within the environment-resistant material and electrically coupled to the controller. The wireless transceiver may include an MQTT transceiver and/or a BLUETOOTH transceiver (i.e., a transceiver that utilizes the MQTT communication protocol for wireless communication and/or a transceiver that utilizes the BLUETOOTH communication protocol for wireless communication).

In an embodiment, the vibration monitoring apparatus further comprises a storage unit within the environment-resistant material and electrically coupled to the controller.

In an embodiment, the vibration monitoring apparatus further comprises a digital processor and instructions to cause the digital processor to process vibration data from the vibration sensor. The instructions may include Fast Fourier Transform instructions.

In an embodiment, the vibration monitoring apparatus further comprises a first part, into which the vibration sensor, the controller, and the power unit are disposed and a second part into which the first part is disposed, the first and second parts defining a gap into which the environment-resistant material is disposed. The environment-resistant material may be an A/B resin.

In an embodiment, the vibration sensor includes an accelerator, in particular a 3-axis MEMS accelerometer.

The disclosure also relates to a vibration monitoring apparatus, comprising an accelerometer, a controller electrically coupled to the accelerometer, a storage unit electrically coupled to the controller, an inductively rechargeable battery electrically coupled to the accelerometer, the controller, and the storage unit, and an environment-resistant material encapsulating the accelerometer, the controller, the storage unit, and the inductively rechargeable battery.

In an embodiment, the vibration monitoring apparatus further comprises a wireless transceiver within the environment-resistant material and electrically coupled to the controller and to the inductively rechargeable battery. The wireless transceiver may include an MQTT transceiver and/or a BLUETOOTH transceiver.

In an embodiment, the accelerometer is a 3-axis MEMS accelerometer.

In an embodiment, the controller includes a digital processor with instructions that, when executed by the digital processor, cause the digital processor to perform pre-processing of vibration data. The instructions may include Fast Fourier Transform instructions.

The disclosure also relates to a vibration monitoring apparatus, comprising an operative unit encapsulated in an environment-resistant material. The operative unit may comprise a power unit, a vibration sensor, and a transceiver. The operative unit may further comprise a processor. The processor may be configured to process signals produced by the vibration sensor into vibration data and to send the vibration data wirelessly using the transceiver.

In an embodiment, the vibration monitoring apparatus further comprises a first part and a second part, the operative unit is disposed in the first part, the first part is disposed in the second part, the first part and the second part define a gap, and the environment-resistant material is disposed in the gap.

The disclosure also relates to a monitoring system including a plurality of operating units connected by fluid conduits and at least a vibration monitoring apparatus as disclosed hereinabove coupled to one of the operating units and the fluid conduits, wherein the monitoring system is for processing liquid and gaseous hydrocarbons produced from a hydrocarbon reservoir, wherein the plurality of operating units include at least one of a phase separator, surge tank, pump liquid manifold, gas manifold, heater, a valve, a flow meter.

In an embodiment, the vibration monitoring apparatus includes a wireless transceiver as disclosed hereinabove, and the monitoring system further includes a data hub disposed remotely to the operating units, wherein the data hub includes wireless communication hardware to communicate with the at least one vibration monitoring apparatus. The data hub may be configured to communicate with one or more of the operating units. The operating units may be disposed in an atmosphere incompatible with operating electronics contrary to the data hub disposed in a safe atmosphere for operating electronics.

In an embodiment, the monitoring system includes a processor and instructions to cause the processor to process vibration data from the vibration sensor to detect an event, wherein the processor is configured to compare a signal based on the vibration data with a calibration signal corresponding to at least a signature of an event. The comparison may be performed using one or more machine learning techniques. The processor may be part of the vibration monitoring apparatus and/or the data hub.

In a first application, the vibration monitoring apparatus is disposed on a valve and the processor is configured to detect one or more of activation, leak or fatigue of the valve using the vibration data.

In a second application, the vibration monitoring apparatus is disposed on a fluid conduit and the processor is configured to detect using the vibration data, one or more of a fluid type—the fluid is one or more of gas, oil, water, gas, or a combination thereof—a presence of solids, and solids type, in the flow flowing in the fluid conduit.

In a third application, the monitoring system is disposed on a floating platform and the processor is configured to determine a reference vibration of the floating platform using the vibration data.

In an embodiment where the data hub communicates with the vibration monitoring apparatus and operating units as disclosed above, the data hub is further configured to perform one or more of the following upon detection of an event by the processor:

Correct a measurement obtained from an operating unit, such as a measurement obtained from a flow meter that can be corrected using vibration data representative of a reference vibration of a floating platform, Trigger an alarm through one or more user interface, in particular an emergency alarm when it a safety relief valve is opened, or a maintenance alarm when a leak or fatigue is detected on a valve or when a certain solids type such as sand is detected in a fluid conduit, Generate a parameter value of one or more of the operating units based on a model of the monitoring system, in particular a parameter value of a phase separator depending on a detected fluid type or a parameter value of a heater when a certain type of solids (such as hydrates) is detected in the fluid conduit.

What is claimed is:

1. An apparatus configured for attachment to a tubular object and operable for monitoring vibration of the tubular object, wherein the apparatus comprises:
    a vibration sensor operable to output vibration data indicative of vibrations of the tubular object;
    a controller electrically coupled to the vibration sensor; and
    a container assembly comprising:
        an outer container made of a plastic material and comprising an outer contact surface configured to accommodate and contact the tubular object, wherein the outer contact surface is non-planar;
        an inner container made of a plastic material and disposed within the outer container, wherein the inner container contains the vibration sensor and the controller;
        a stand extending between the inner container and the outer container; and
        a sealant material disposed within a space defined between the inner container and the outer container, wherein the sealant material encapsulates the inner container; and
    an inductively rechargeable battery electrically coupled to the vibration sensor and the controller.

2. A system comprising a plurality of operating units connected by fluid conduits and a vibration monitoring apparatus, wherein:
    the vibration monitoring apparatus comprises a vibration sensor, a controller, and a power unit;
    the operating units are for processing a fluid comprising liquid and gaseous hydrocarbons produced from a hydrocarbon reservoir;
    the vibration sensor is operable to output vibration data of a tubular object; and
    the controller is operable to receive the vibration data and to detect, based on the vibration data, at least one of:
        a fluid type comprising at least one of gas, oil, water, and a combination thereof;
        a presence of solids in the fluid; and
        a solids type in the fluid; and
    an inner container disposed within an outer container, wherein the inner container contains the vibration sensor and the controller, and wherein the out container has an outer contact surface configured to accommodate and contact the tubular object, wherein the outer contact surface is non-planar;
    a stand extending between the inner container and the outer container; and
    a sealant material disposed within a space defined between the inner container and the outer container, wherein the sealant material encapsulates the inner container.

3. The system according to claim 2, wherein the vibration monitoring apparatus further comprises a wireless transceiver electrically coupled to the controller, wherein the system further includes a data hub disposed remotely to the operating units, and wherein the data hub includes wireless communication hardware to communicate with the vibration monitoring apparatus.

4. The system according to claim 3, wherein the data hub is configured to communicate with one or more of the operating units.

5. The system according to claim 2, wherein the controller includes a processor and instructions to cause the processor to process the vibration data from the vibration sensor to detect an event, wherein the processor is configured to compare a signal based on the vibration data with a calibration signal corresponding to a signature of the event, and wherein the event comprises at least one of:
    the fluid type;
    the presence of solids; and
    the solids type.

6. The system according to claim 2, wherein the operating units comprise a valve, and wherein the controller is further operable to detect, based on the vibration data, one or more of activation, leak, and fatigue of the valve based on the vibration data.

7. The system according to claim 2, wherein the system is disposed on a floating platform, and wherein the controller is further operable to determine a reference vibration of the floating platform based on the vibration data and to correct a measurement obtained from an instance of the operating units based on the reference vibration.

8. The system according to claim 2, wherein the controller is further operable to perform one or more of the following upon detection of an event:
    correct a measurement obtained from the at least one of the operating units,
    trigger an alarm through one or more user interface, and
    generate a parameter value of the at least one of the operating units based on a model of the system.

9. The system according to claim 2, wherein the operating units include at least one of a phase separator, surge tank, pump, liquid manifold, gas manifold, heater, a valve, and a flow meter.

10. An apparatus configured for attachment to a tubular object and operable for monitoring vibration of the tubular object, wherein the apparatus comprises:
    a vibration sensor operable to output vibration data indicative of vibrations of the tubular object;
    a controller electrically coupled to the vibration sensor; and
    a container assembly comprising:
        an outer container made of a plastic material and comprising an outer contact surface configured to accommodate and contact the tubular object, wherein the outer contact surface is non-planar;

an inner container made of a plastic material and disposed within the outer container, wherein the inner container contains the vibration sensor and the controller;

a stand extending between the inner container and the outer container; and a sealant material disposed within a space defined between the inner container and the outer container, wherein the sealant material encapsulates the inner container.

11. The apparatus of claim 10 further comprising a wireless transceiver within the inner container and electrically coupled to the controller, an inductively rechargeable battery electrically coupled to the vibration sensor and the controller, or both.

12. The apparatus of claim 10 further comprising a data storage unit within the inner container and electrically coupled to the controller.

13. The apparatus of claim 10 wherein the controller comprises a digital processor and instructions to cause the digital processor to process the vibration data from the vibration sensor.

14. The apparatus of claim 10 wherein the sealant material is an AB resin.

15. The apparatus of claim 10 wherein the outer contact surface is curved.

16. The apparatus of claim 10 wherein the outer contact surface comprises an angle between a first portion of the outer contact surface and a second portion of the outer contact surface.

17. The apparatus of claim 10 wherein the outer container further comprises an inner surface opposite the outer contact surface, and wherein the inner surface comprises a peak between a first portion of the inner surface and a second portion of the inner surface.

18. The apparatus of claim 17 wherein the stand comprises a notch between a first portion of the stand and a second portion of the stand, and wherein the notch accommodates at least a portion of the peak.

19. The apparatus of claim 10 wherein:

the vibration sensor is a first vibration sensor;

the vibration data is a first vibration data;

the outer container further comprises an inner surface opposite the outer contact surface;

the apparatus further comprises a second vibration sensor operable to output second vibration data indicative of the vibrations of the tubular object;

the second vibration sensor is disposed on the inner surface; and the second vibration sensor comprises a vibration frequency response that is higher than a vibration frequency response of the first vibration sensor.

20. The apparatus of claim 10 wherein the sealant material is caused to flow into the space between the inner container and the outer container and permitted to solidify such that the sealant material encapsulates the inner container.

* * * * *